United States Patent
Lee et al.

(10) Patent No.: US 11,543,662 B2
(45) Date of Patent: Jan. 3, 2023

(54) AUGMENTED REALITY DEVICE INCLUDING REFLECTIVE POLARIZER AND WEARABLE DEVICE INCLUDING THE SAME

(71) Applicant: SAMSUNG ELECTRONICS CO., LTD., Suwon-si (KR)

(72) Inventors: Kyookeun Lee, Suwon-si (KR);
Jeonggeun Yun, Suwon-si (KR);
Myongjo Choi, Suwon-si (KR);
Kyusub Kwak, Suwon-si (KR);
Wonjun Lee, Suwon-si (KR); Jongchul Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 102 days.

(21) Appl. No.: 17/027,860

(22) Filed: Sep. 22, 2020

(65) Prior Publication Data

US 2021/0088792 A1 Mar. 25, 2021

(30) Foreign Application Priority Data

Sep. 24, 2019 (KR) .......................... 10-2019-0117487

(51) Int. Cl.
| | |
|---|---|
| G02B 27/28 | (2006.01) |
| G02B 27/01 | (2006.01) |
| G02B 5/30 | (2006.01) |
| G02F 1/29 | (2006.01) |

(Continued)

(52) U.S. Cl.
CPC ....... *G02B 27/0172* (2013.01); *G02B 5/3058* (2013.01); *G02B 6/0016* (2013.01); *G02B 6/0036* (2013.01); *G02B 27/283* (2013.01); *G02F 1/29* (2013.01); *G06T 11/60* (2013.01); *G02B 2027/014* (2013.01); *G02B 2027/0178* (2013.01); *G02F 1/294* (2021.01)

(58) Field of Classification Search
CPC ...... G02B 2027/014; G02B 2027/0178; G02B 27/0172; G02B 27/283; G02B 5/3058; G02B 6/0016; G02B 6/0036; G02F 1/29; G02F 1/294; G06T 11/60
See application file for complete search history.

(56) References Cited

U.S. PATENT DOCUMENTS

| | | | |
|---|---|---|---|
| 9,927,614 B2 | 3/2018 | Vallius | |
| 10,890,776 B1* | 1/2021 | Gao | .................. G02B 27/0172 |
| 2018/0210287 A1* | 7/2018 | Wang | ................ G02F 1/133602 |

(Continued)

*Primary Examiner* — Ram A Mistry
(74) *Attorney, Agent, or Firm* — Sughrue Mion, PLLC

(57) ABSTRACT

Provided is an augmented reality device including a display element configured to generate a first image, an optical coupler including a first surface through which the first image is input and a second surface opposite the first surface and configured to output light that is input through the first surface to the second surface and output light that is input through the second surface to the first surface, a reflective polarizer provided on the side of the second surface of the optical coupler and configured to reflect light with a first polarization and transmit light with a second polarization different from the first polarization, and a polarization selective variable focus lens provided in a traveling path of the light with the first polarization reflected by the reflective polarizer and having variable refractive power with respect to the light with the first polarization.

19 Claims, 10 Drawing Sheets

(51) Int. Cl.
*F21V 8/00* (2006.01)
*G06T 11/60* (2006.01)

(56) References Cited

U.S. PATENT DOCUMENTS

2018/0239177 A1* 8/2018 Oh .................. G02B 6/0056
2018/0275394 A1 9/2018 Yeoh et al.
2022/0004001 A1* 1/2022 Danziger ................ G02B 6/00

* cited by examiner

AUGMENTED REALITY DEVICE INCLUDING REFLECTIVE POLARIZER AND WEARABLE DEVICE INCLUDING THE SAME

CROSS-REFERENCE TO RELATED APPLICATION

This application is based on and claims priority under 35 U.S.C. § 119 to Korean Patent Application No. 10-2019-0117487, filed on Sep. 24, 2019, in the Korean Intellectual Property Office, the disclosure of which is incorporated by reference herein in its entirety.

BACKGROUND

1. Field

The disclosure relates to an augmented reality device and a wearable device including the same.

2. Description of Related Art

Augmented reality technology refers to a technology of providing to a user an image formed by overlapping an image of a real world viewed by the user with a virtual image. Augmented reality devices (e.g., smart glasses) using augmented reality technology are useful in everyday life, e.g., for information retrieval, route guidance, and taking pictures. In particular, smart glasses are used as fashion items and used in outdoor environments.

An augmented reality device is capable of providing an image to a user through a see-through display located in front of the user's eyes when the user is wearing the augmented reality device. The image may include an image of at least one real object in a physical environment or space seen directly by the user. The augmented reality device may project a virtual image onto the user's eyes through the see-through display. Accordingly, the user can simultaneously view the real object and the virtual image through the see-through display.

When the user views the virtual image through the see-through display while wearing the augmented reality device, the distance between the user's eyes and the see-through display may be different from a focal length with respect to the real object due to a binocular disparity. Accordingly, a focus position where the virtual image is displayed and a focus position of the real object are not identical, thus making the user feel dizzy or experience motion sickness. This problem is called a vergence-accommodation conflict (VAC). This problem can be solved by adjusting the focus of the virtual image.

In order to adjust the focus of the virtual image, a plurality of lenses may be provided on the see-through display to adjust the focus of the virtual image. Polarization of the real object and polarization of the virtual image which are transmitted to the user's eyes through the see-through display may be separated from each other by a polarizer and thereafter focus adjustment may be performed on the virtual image by using a variable focus lens having refractive power with respect to only a certain polarization.

However, the size of the augmented reality device may become large when the plurality of lenses are used. In addition, it is not easy to separate the polarization of the real object and the polarization of the virtual image from each other when the polarizer and the variable focus lens are used.

SUMMARY

Provided is an augmented reality device capable of more easily separating polarization of a beam of an image of a real object from polarization of a beam of a virtual image, and a wearable device including the same.

Provided is an augmented reality device including a wire grid polarizer and a wearable device including the augmented reality device.

Focus adjustment may be performed on a virtual image by using an augmented reality device according to an embodiment of the disclosure to reduce dizziness of a user.

Additional aspects will be set forth in part in the description which follows and, in part, will be apparent from the description, or may be learned by practice of embodiments of the disclosure.

In accordance with an aspect of the disclosure, an augmented reality device includes a display element configured to generate a first image; an optical coupler including a first surface through which the first image is input and a second surface opposite the first surface, the optical coupler being configured to output light that is input through the first surface to the second surface and output light that is input through the second surface to the first surface; a reflective polarizer provided on the side of the second surface of the optical coupler and configured to reflect first polarized light with a first polarization and transmit second polarized light with a second polarization different from the first polarization; and a polarization selective variable focus lens provided in a traveling path of the first polarized light that has been reflected by the reflective polarizer, the polarization selective variable focus lens having variable refractive power with respect to the first polarized light.

The optical coupler may be further configured to combine the first polarized light that has been reflected by the reflective polarizer and the second polarized light that has been transmitted by the reflective polarizer and provide a combination result to a user.

A first polarization axis of the first polarization and a second polarization axis of the second polarization may be perpendicular to each other.

The reflective polarizer may include a wire grid polarizer, wherein the wire grid polarizer includes a substrate and a plurality of parallel conductive wires on the substrate.

The plurality of parallel conductive wires may include metal wires.

The first polarized light may be perpendicularly incident to the polarization selective variable focus lens.

The optical coupler may include an input grating provided on the first surface or the second surface, wherein the input grating is configured to diffract the light that is input through the first surface such that the light that is input through the first surface travels inside the optical coupler while being totally reflected.

The optical coupler may further include an output grating provided on the first surface or the second surface, wherein the output grating is configured to output light, which has traveled inside the optical coupler while being totally reflected, to the outside of the optical coupler toward the reflective polarizer.

The polarization selective variable focus lens may include a liquid crystal lens of electrically variable refractive power.

The polarization selective variable focus lens may have no refractive power with respect to the second polarized light.

A refractive power of the augmented reality device with respect to the first polarized light may be in a range of 0 diopters to 4 diopters.

The polarization selective variable focus lens may be provided between the reflective polarizer and the optical coupler.

The augmented reality device may further include a processor configured to transmit, to the display element, a signal based on data processed to generate the first image.

The augmented reality device may further include a processor configured to adjust a voltage to be applied to the polarization selective variable focus lens.

A plane of the optical coupler and a plane of the reflective polarizer may be inclined at a nonzero angle with respect to a plane of the polarization selective variable focus lens.

The polarization selective variable focus lens may be provided on the side of the first surface of the optical coupler.

A plane of the reflective polarizer and a plane of the optical coupler may be inclined with respect to a plane of the polarization selective variable focus lens, and the optical coupler may be further configured to output a part of the light that is input through the first surface through the first surface.

The reflective polarizer may include a curved surface.

A refractive power of the augmented reality device with respect to the first polarized light may be in a range of 2 diopters to 6 diopters.

The augmented reality device may include a wearable device.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
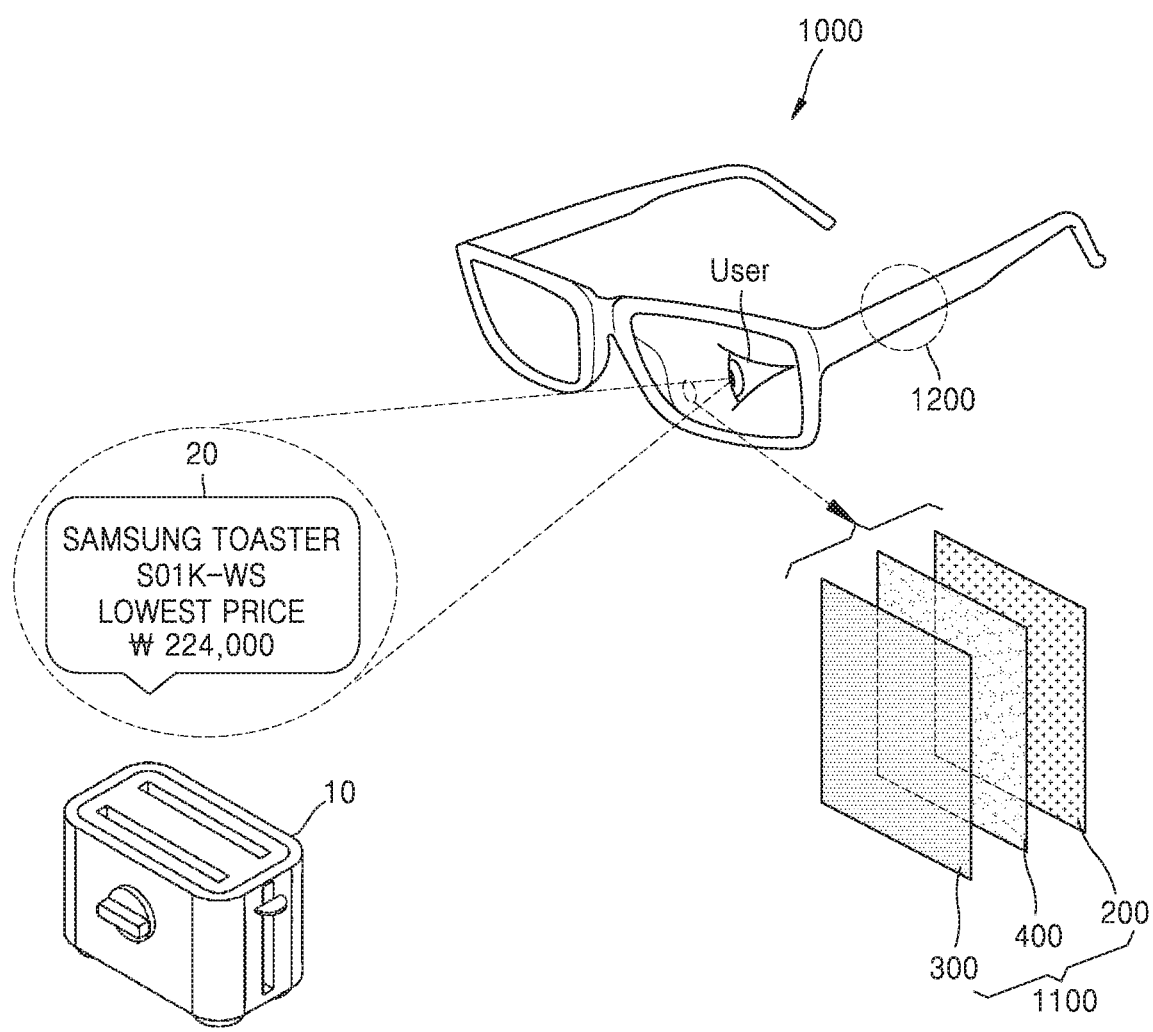
FIG. 1 is a conceptual diagram schematically illustrating a state in which an augmented reality device according to an embodiment displays a virtual image on a real object.

Hereinafter, augmented reality devices and wearable devices including the same according to embodiments of the disclosure will be described in detail with reference to the accompanying drawings. In the drawings, the same reference numerals represent the same elements and a size or thickness of each element may be exaggerated for clarity.

Terms such as first and second may be used to describe various components but the components should not be limited by the terms. These terms are only used to distinguish one component from another. Augmented reality devices and wearable devices including the same may be embodied in many different forms and are not limited to embodiments of the disclosure set forth herein.

It will be understood that when an element is referred to as "including" another element, the element may further include additional elements unless mentioned otherwise.

Throughout the disclosure, the expression "at least one of a, b or c" indicates only a, only b, only c, both a and b, both a and c, both b and c, all of a, b, and c, or variations thereof.

FIG. 1 is a conceptual diagram schematically illustrating a state in which an augmented reality device 1000 according to an embodiment displays a virtual image 20 on an image of a real object 10.

Referring to FIG. 1, a user is able to view the real object 10 and the virtual image 20 while wearing the augmented reality device 1000. The virtual image 20 is a virtual image generated by a display element 100 (see FIG. 2) of the augmented reality device 1000 and may include information related to the real object 10. For example, the virtual image 20 may be an image including the name, model name, and price information of a toaster that is the real object 10.

The augmented reality device 1000 may include a see-through display 1100 and a frame 1200. A user is able to view one image, which is a combination of the image of the real object 10 and the virtual image 20, through the see-through display 1100. The see-through display 1100 may include an optical coupler 200, a reflective polarizer 300, and a variable focus lens (i.e., polarization selective variable focus lens) 400. The frame 1200 may be a support supporting the see-through display 1100. For example, when a user mounts the augmented reality device 1000 on his or her head, the frame 1200 may act as a leg of glasses. The augmented reality device 1000 may further include a display element 100 and a processor 500 (see FIG. 2). For example, the display element 100 and the processor 500 may be provided in the frame 1200. However, the disclosure is not limited thereto, and the augmented reality device 1000 may further include a separate component in which the display element 100 and the processor 500 may be provided.

When the user wears the augmented reality device 1000, in the see-through display 1100, the optical coupler 200 may be located adjacent to (i.e., closest to) the user's eye and the reflective polarizer 300 may be located at a position adjacent to the real object 10 (i.e., farthest from the user's eye). The variable focus lens 400 may be provided between the reflective polarizer 300 and the optical coupler 200. However, the disclosure is not limited thereto, and the variable focus lens 400 may be provided between the optical coupler 200 and the user.

When the user views the virtual image 20 through the see-through display 1100 while wearing the augmented reality device 1000, the distance between the user's eyes and the see-through display 1100 may be different from a focal length with respect to the real object 10 due to a binocular disparity. In this case, a focus of the virtual image 20 may be adjusted so that the distance between the user's eyes and the see-through display 1100 and the focal length with respect to the real object 10 due to the binocular disparity may be the same. A method of adjusting the focus of the virtual image 20 will be described with reference to FIG. 2 below. The user is able to view one image, which is a combination of the real object 10 and the virtual image 20, through the see-through display 1100.

Figure 2:
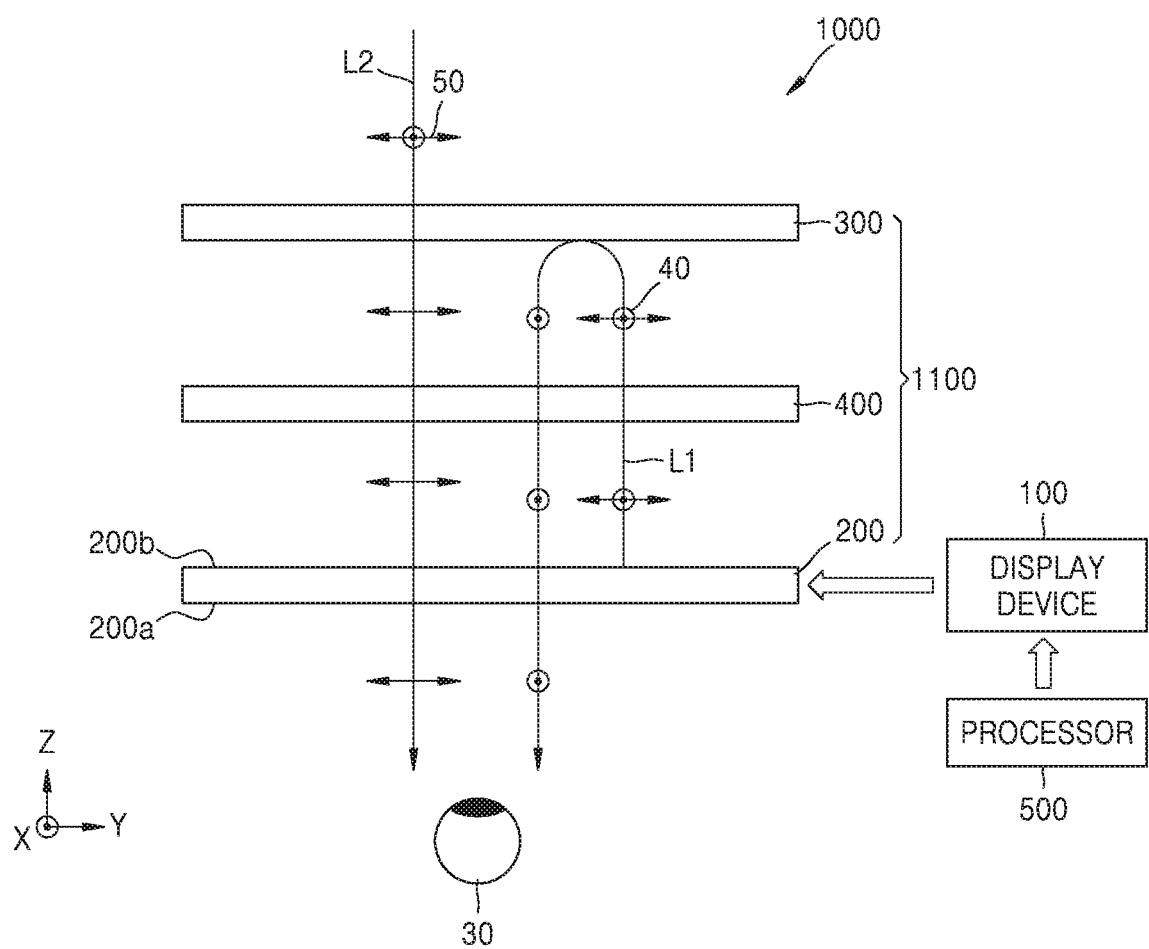
FIG. 2 is a diagram schematically illustrating a configuration of an augmented reality device according to an embodiment.
Figure 3:
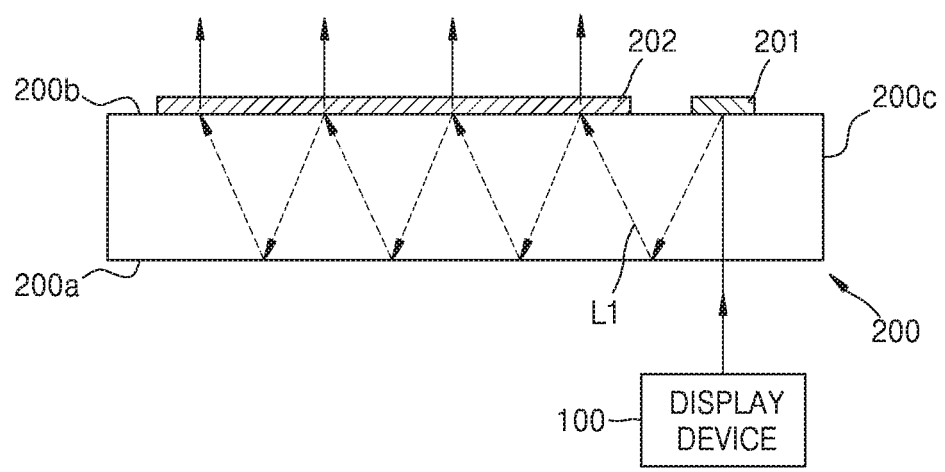
FIG. 3 is a diagram schematically illustrating a configuration of an optical coupler included in the augmented reality device of FIG. 2 according to an embodiment.
Figure 4:
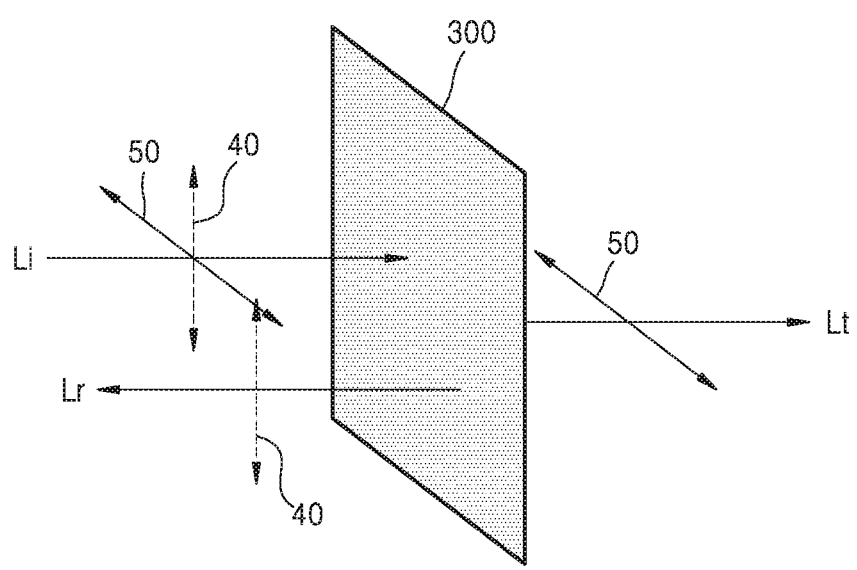
FIG. 4 is a conceptual diagram schematically illustrating a principle of polarization separation of incident light through a reflective polarizer included in the augmented reality device of FIG. 2 according to an embodiment.
Figure 5:
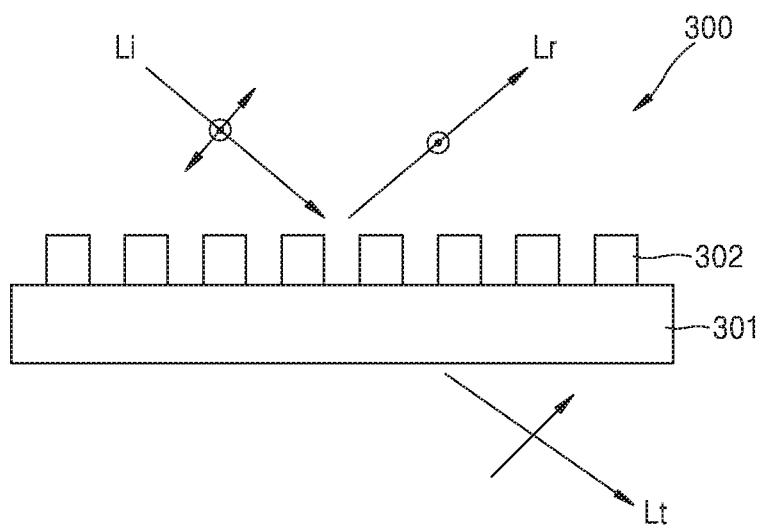
FIG. 5 is a diagram schematically illustrating a configuration of the reflective polarizer included in the augmented reality device of FIG. 2 according to an embodiment.

FIG. 2 is a diagram schematically illustrating a configuration of an augmented reality device 1000 according to an embodiment. FIG. 3 is a diagram schematically illustrating a configuration of an optical coupler 200 included in the augmented reality device 1000 of FIG. 2. FIG. 4 is a conceptual diagram schematically illustrating a principle of polarization separation of incident light through a reflective polarizer 300 included in the augmented reality device 1000 of FIG. 2. FIG. 5 is a diagram schematically illustrating a configuration of the reflective polarizer 300 included in the augmented reality device 1000 of FIG. 2.

Referring to FIG. 2, the augmented reality device 1000 may include a display element 100 which generates a first image and an optical coupler 200 which includes a first surface 200a through which the first image is input from the display element (see FIG. 3) and a second surface 200b opposite the first surface 200a. The optical coupler 200 may be configured to output light that is input through the first surface 200a to the second surface 200b, and output light that is input through the second surface 200b to the first side 200a. The augmented reality device 1000 may include a reflective polarizer 300 provided on the side of (i.e., facing) the second surface 200b of the optical coupler. The reflective polarizer 300 reflects light with a first polarization (i.e., first polarized light) 40 and transmits light with a second polarization (i.e., second polarized light) 50 which is different from the first polarization 40. The augmented reality device 1000 may include a polarization selective variable focus lens 400 provided in a traveling path of the light with the first polarization 40 that has been reflected by the reflective polarizer 300 and having variable refractive power with respect to the light with the first polarization 40. The first image refers to the virtual image 20 described above with reference to FIG. 1. The optical coupler 200, the reflective polarizer 300 and the polarization selective variable focus lens 400 may be included in the see-through display 1100 as described above with reference to FIG. 1.

The display element 100 modulates light according to information about the first image to form first light L1 of the first image. The first image may be a two-dimensional (2D) image or a three-dimensional (3D) image, and the 3D image may be a hologram image, a stereo image, a light-field image, an integral photography (IP) image, or the like or may include a multi-view or super multi-view image.

Referring to FIG. 3, the display element 100 may generate the first image and project the first image to an incidence surface (ex. the first surface 200a) of the optical coupler 200. For example, the display element 100 may project the first light L1 of the first image onto the first surface 200a, and the first light L1 may be totally reflected inside the optical coupler 200. However, the disclosure is not limited thereto, and the display element 100 may generate the first image and project the first light L1 of the first image onto a side surface 200c of the optical coupler 200. A part of the first light L1 may be output to the outside of the optical coupler 200 during the otherwise total internal reflection thereof. The principle that the first light L1 is output to the outside of the optical coupler 200 will be described with reference to FIG. 3 below.

The display element 100 may include, for example, a liquid-crystal-on-silicon (LCoS) element, a liquid crystal display (LCD) element, an organic light-emitting diode (OLED) display element, or a digital micro-mirror device (DMD) or may include a next-generation display element such as a micro-LED and a quantum dot (QD) LED. A plurality of display elements 100 may be provided to project different virtual images with respect to both eyes of the user.

The optical coupler 200 may be formed of a transparent material. Accordingly, the optical coupler 200 is capable of transmitting the first light L1 so that the first light L1 of the first image that has been reflected from the reflective polarizer 300 may then be transmitted to the user's eye 30. In addition, the optical coupler 200 may transmit second light L2 so that the second light L2 of the second image may be transmitted to the user's eye 30 from the outside of the augmented reality device 1000. The second image refers to the image of the real object 10 described above with reference to FIG. 1. In this way, the optical coupler 200 may transmit the first light L1 and the second light L2 to be simultaneously transmitted to the user's eyes 30. Accordingly, the user is able to view one image which is a combination of the first image and the second image.

The optical coupler 200 may output the first light L1 of the first image projected from the display element 100 through the second surface 200b. Accordingly, the first light L1 output from the optical coupler 200 may travel toward the reflective polarizer 300 on the side of the second surface 200b of the optical coupler 200. Referring to FIG. 3, the first light L1 may travel through total internal reflection inside the optical coupler 200. For example, the optical coupler 200 may be a wave guide in which the first light L1 may travel through total internal reflection. The optical coupler 200 may further include an input grating 201 which is provided on the second surface 200b and diffracts the first light L1 that is input through the first surface from the display element 100 so that the first light L1 may travel inside and along a length of the optical coupler 200 through total internal reflection. However, the disclosure is not limited thereto, and the input grating 201 may be provided on the first surface 200a of the optical coupler 200. Furthermore, the optical coupler 200 may further include an output grating 202 which is provided on the second surface 200b and diffracts the first light L1 that has traveled inside the optical coupler 200, so that the first light L1 may be output to the outside of the optical coupler 200. However, the disclosure is not limited thereto, and the output grating 201 may be provided on the first surface 200a of the optical coupler 200.

The reflective polarizer 300 may reflect light incident from the optical coupler 200, that is, the light with the first polarization 40 of the first light L1. The light with the first polarization 40 that has been reflected by the reflective polarizer 300 may then be incident perpendicularly on the polarization selective variable focus lens 400. In addition, the reflective polarizer 300 may also transmit light incident from the outside of the augmented reality device 1000, that is, the light with the second polarization 50 of the second light L2. A polarization axis (i.e., a first polarization axis) of the light with the first polarization 40 and a polarization axis (i.e., a second polarization axis) of the light with the second polarization 50 may be perpendicular to each other. Both the first light L1 with the first polarization 40 reflected by the reflective polarizer 300 and the second light L2 with the second polarization 50 transmitted through the reflective polarizer 300 may travel from the reflective polarizer 300 toward the optical coupler 200.

Referring to FIG. 4, the reflective polarizer 300 may reflect light with a first polarization 40 and transmit light with the second polarization 50 from among incident light Li including both the first polarization 40 and the second polarization 50. Accordingly, the incident light Li incident on the reflective polarizer 300 may be divided into reflected light Lr with the first polarization 40 and transmitted light Lt with the second polarization 50. Although for convenience of explanation, FIG. 4 illustrates that incident light Li includes only the light with the first polarization 40 and the light with the second polarization 50, the incident light Li may have polarization in various directions.

Referring to FIG. 5, the reflective polarizer 300 may be a wire grid polarizer which includes a substrate 301 and a plurality of parallel conductive wires 302 on the substrate 301. The plurality of parallel conductive wires 302 may be arranged in an array. For example, the plurality of parallel conductive wires 302 may include metal wires. The incident light Li with the first polarization 40 and the second polarization 50 may be divided into reflected light Lr with the first polarization 40 and transmitted light Lt with the second polarization 50 by the reflective polarizer 300 as described above with reference to FIG. 4.

The polarization selective variable focus lens 400 may have variable refractive power only with respect to light of a certain polarization. For example, the polarization selective variable focus lens 400 may have variable refractive power only with respect to light of the first polarization 40. In this case, refractive power of the augmented reality device 1000 with respect to the light L1 with the first polarization 40 may be in a range of 0 diopters to 4 diopters. On the other hand, the polarization selective variable focus lens 400 may not have refractive power with respect to the second light L2 with the second polarization 50. Accordingly, focus adjustment may be performed only with respect to the first light L1 with the first polarization 40 among the first light L1 and the second light L2 which are incident on the polarization selective variable focus lens 400. The polarization selective variable focus lens 400 may then transmit the second light L2 without performing focus adjustment thereon. The polarization selective variable focus lens 400 may include, for example, a liquid crystal lens having electrically variable refractive power. An electrically tunable liquid crystal lens includes liquid crystal molecules and thus is capable of changing a focal length of output light according to an electric driving signal. Therefore, the refractive power of the polarization selective variable focus lens 400 may be changed by adjusting a voltage applied to the polarization selective variable focus lens 400.

The polarization selective variable focus lens 400 may be provided in a traveling path of light with the first polarization 40 that has been reflected by the reflective polarizer 300. For example, the polarization selective variable focus lens 400 may be provided between the optical coupler 200 and the reflective polarizer 300. In this case, the first light L1 with the first polarization 40 output from the optical coupler 200 may pass through the polarization selective variable focus lens 400 twice, i.e., once before being reflected by the reflective polarizer 300 and once after being reflected by the reflective polarizer 300. Accordingly, the polarization selective variable focus lens 400 may perform focus adjustment twice with respect to the first light L1. In contrast, the polarization selective variable focus lens 400 may not perform focus adjustment with respect to the second light L2 with the second polarization 50 that has been transmitted through the reflective polarizer 300. The focused first light L1 and the unfocused second light L2 may then simultaneously travel toward the optical coupler 200. Accordingly, the optical coupler 200 may combine the light of the first polarization 40 reflected by the reflective polarizer 300 and the light of the second polarization 50 transmitted by the reflective polarizer 300 and provide a result of the combination to a user. In other words, the first light L1 of the focused first image and the second light L2 of the unfocused second image may pass through the optical coupler 200 and travel toward the user's eye 30.

The augmented reality device 1000 may further include a processor 500 that transmits to the display element 100 a signal based on data processed to generate the first image, that is, the virtual image 20 (see FIG. 1). The processor 500 may process information about the second image viewed by a user, that is, the virtual image 20 corresponding to the real object 10 (see FIG. 1) in real time, and transmit a signal to the display element 100 based on a result of processing the information. The display element 100 may generate the virtual image 20, based on a signal from the processor 500. For example, the processor 500 may identify the real object 10, form a signal by processing information necessary to appropriately form the virtual image 20, and display the signal to the display element 100. The augmented reality device 1000 may further include additional equipment such as a camera or a depth camera to help the processor 500 identify the real object 10.

In addition, the processor 500 may adjust a voltage to be applied to the variable focus lens 400. As the voltage to be applied to the variable focus lens 400 is adjusted, the refractive power of the polarization selective variable focus lens 400 with respect to the first light L1 with the first polarization 40 may change. In other words, the processor 500 may adjust a focal length with respect to the first light L1 of the virtual image 20 by adjusting the voltage to be applied to the variable focus lens 400.

Figure 6:
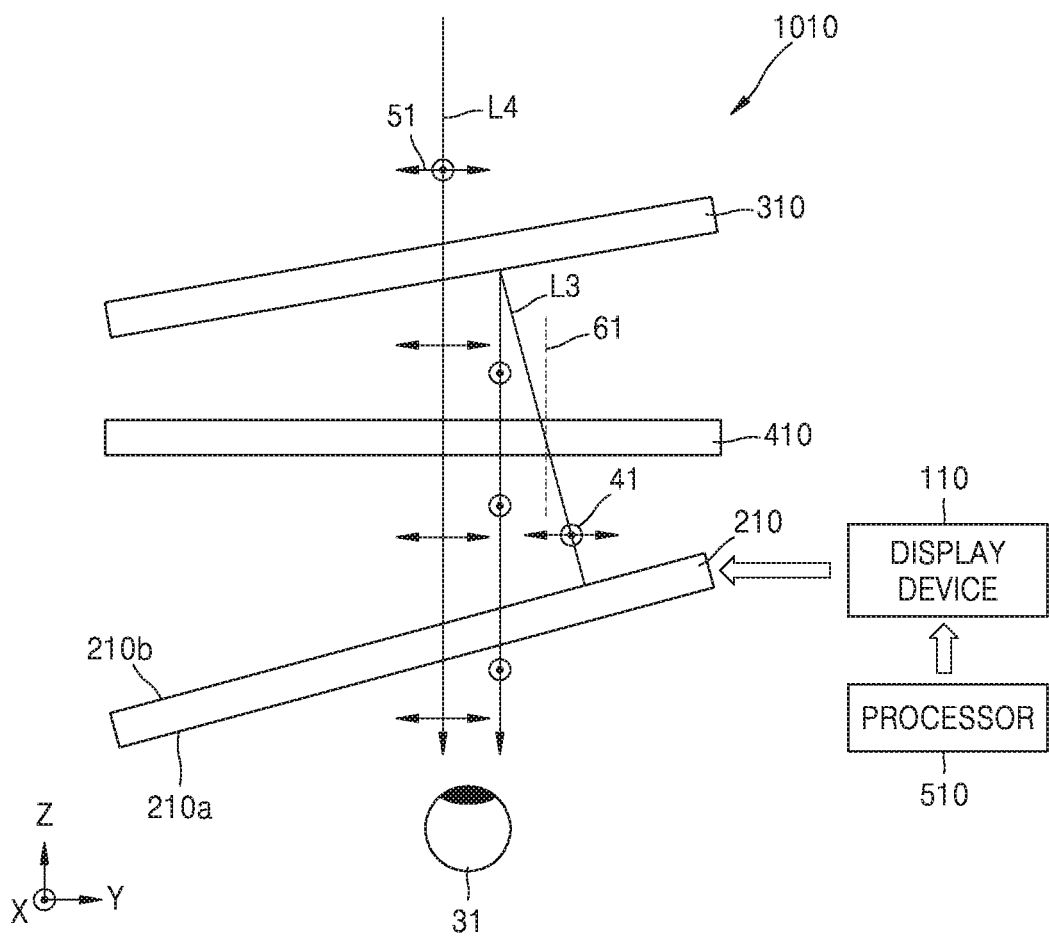
FIG. 6 is a diagram schematically illustrating a configuration of an augmented reality device according to an embodiment.

FIG. 6 is a diagram schematically illustrating a configuration of an augmented reality device 1010 according to an embodiment. In describing FIG. 6, a description of parts of FIG. 6 that are the same as those of FIG. 2 is omitted. For example, a display element 110, an optical coupler 210, a reflective polarizer 310, a polarization selective variable focus lens 410 and a processor 510 may be substantially the same as the display element 100, the optical coupler 200, the reflective polarizer 300, the polarization selective variable focus lens 400 and the processor 500 of FIG. 2.

Referring to FIG. 6, the augmented reality device 1010 may include: the display element 110 which generates a first image and the optical coupler 210 which includes a first surface 210a through which the first image is input from the display element 110 and a second surface 210b opposite the first surface 200a. The optical coupler 210 may be configured to output light that is input through the first surface 210a to the second surface 210b, and output light that is input through the second surface 210b to the first surface 210a The augmented reality device 1010 may include the reflective polarizer 310 provided on the side of the second surface 210b of the optical coupler 210. The reflective polarizer 310 reflects light with a first polarization 41 and transmits light with a second polarization 51 which is different from the first polarization 41 The augmented reality device 1010 may include the polarization selective variable focus lens 410 provided in a traveling path of the light with the first polarization 41 that has been reflected by the reflective polarizer 310 and having variable refractive power with respect to the light with the first polarization 41.

The polarization selective variable focus lens 410 may be provided between the optical coupler 210 and the reflective polarizer 310. Furthermore, the optical coupler 210 and the reflective polarizer 310 may be formed to be inclined (i.e., at a nonzero angle) with respect to the polarization selective variable focus lens 410. Accordingly, first light L3 emitted from the second surface 210b of the optical coupler 210 may be incident on the polarization selective variable focus lens 410 at a predetermined angle with respect to a normal 61 of the polarization selective variable focus lens 410. The polarization selective variable focus lens 410 may perform primary focus adjustment on the first light L3. The reflective polarizer 310 may reflect light with the first polarization 41 of the first light L3 primarily focused by the polarization selective variable focus lens 410. The light with the first polarization 41 reflected by the reflective polarizer 310 may then be incident perpendicularly to the polarization selective variable focus lens 410. The polarization selective variable focus lens 410 may perform secondary focus adjustment on the light with the first polarization 41 that has been reflected by the reflective polarizer 310. The light with the first polarization 41 on which secondary focus adjustment has been performed by the polarization selective variable focus lens 410 may then pass through the optical coupler 210.

Second light L4 from the outside of the augmented reality device 1010 may be incident on the reflective polarizer 310 inclined with respect to the polarization selective variable focus lens 410. The reflective polarizer 310 may transmit light with the second polarization 51 of the second light L4. The second light L4 transmitted through the reflective polarizer 310 may sequentially passes through the variable focus lens 410 and the optical coupler 210. The polarization selective variable focus lens 410 may not perform focus adjustment on the second light L4 with the second polarization 51.

As such, the light with the first polarization 41 and the light with the second polarization 51 transmitted through the optical coupler 210 may both travel toward a user's eye 31.

Figure 7:
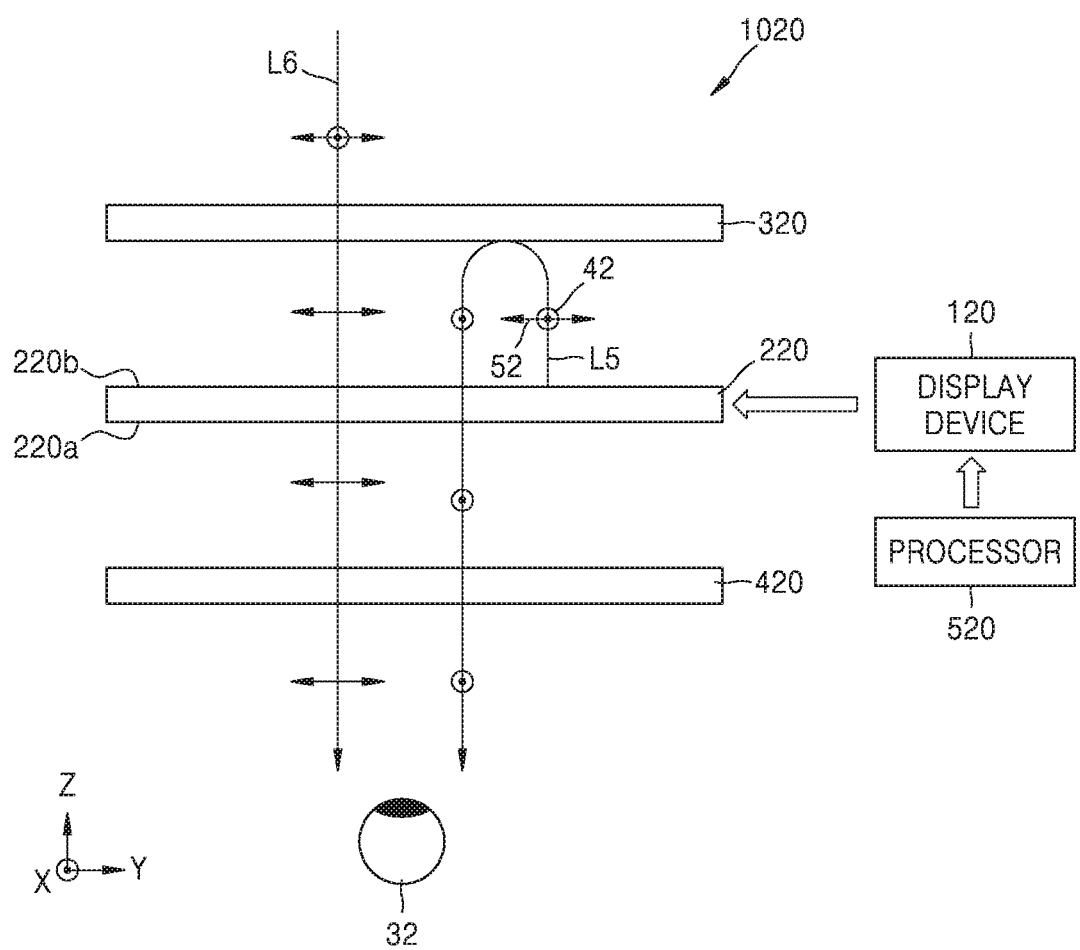
FIG. 7 is a diagram schematically illustrating a configuration of an augmented reality device according to an embodiment.

FIG. 7 is a diagram schematically illustrating a configuration of an augmented reality device 1020 according to an embodiment. In describing FIG. 7, a description of parts of FIG. 7 that are the same as those of FIG. 2 is omitted. For example, a display element 120, an optical coupler 220, a reflective polarizer 320, a polarization selective variable focus lens 420 and a processor 520 may be substantially the same as the display element 100, the optical coupler 200, the reflective polarizer 300, the polarization selective variable focus lens 400 and the processor 500 of FIG. 2.

Referring to FIG. 7, the augmented reality device 1020 may include the display element 120 which generates a first image and the optical coupler 220 which includes a first surface 220a through which the first image is input from the display element and a second surface 220b opposite the first surface 220a. The optical coupler 220 may be configured to output light that is input through the first surface 220a to the second surface 220b, and output light that is input through the second surface 220b to the first surface 220a. The augmented reality device 1020 may include the reflective polarizer 320 provided on the side of the second surface 220b of the optical coupler 220. The reflective polarizer 320 reflects light with a first polarization 42 and transmits light with a second polarization 52 which is different from the first polarization 42. The augmented reality device 1020 may include the polarization selective variable focus lens 420 provided in a traveling path of the light with the first polarization 42 that has been reflected by the reflective polarizer 320 and having variable refractive power with respect to the light with the first polarization 42.

The polarization selective variable focus lens 420 may be provided on the side of the first surface 220a of the optical coupler 220. The reflective polarizer 320 may reflect light with the first polarization 42 of first light L5 that has been emitted from the second surface 220b of the optical coupler 220. The reflected light with the first polarization 42 may then sequentially pass back through the optical coupler 220 and then through the variable focus lens 420. The polarization selective variable focus lens 420 may perform focus adjustment on the light with the first polarization 42.

Second light L6 from the outside of the augmented reality device 1020 may be incident on the reflective polarizer 320. The reflective polarizer 320 may transmit light with the second polarization 52 of the second light L6. The second light L6 transmitted through the reflective polarizer 320 may then sequentially pass through the optical coupler 220 and the polarization selective variable focus lens 420. The polarization selective variable focus lens 420 may not perform focus adjustment on the second light L6 with the second polarization 52.

As described above, the light with the first polarization 42 and the light with the second polarization 52 that sequentially pass through the optical coupler 210 and the polarization selective variable focus lens 420 may travel toward a user's eye 32.

Figure 8:
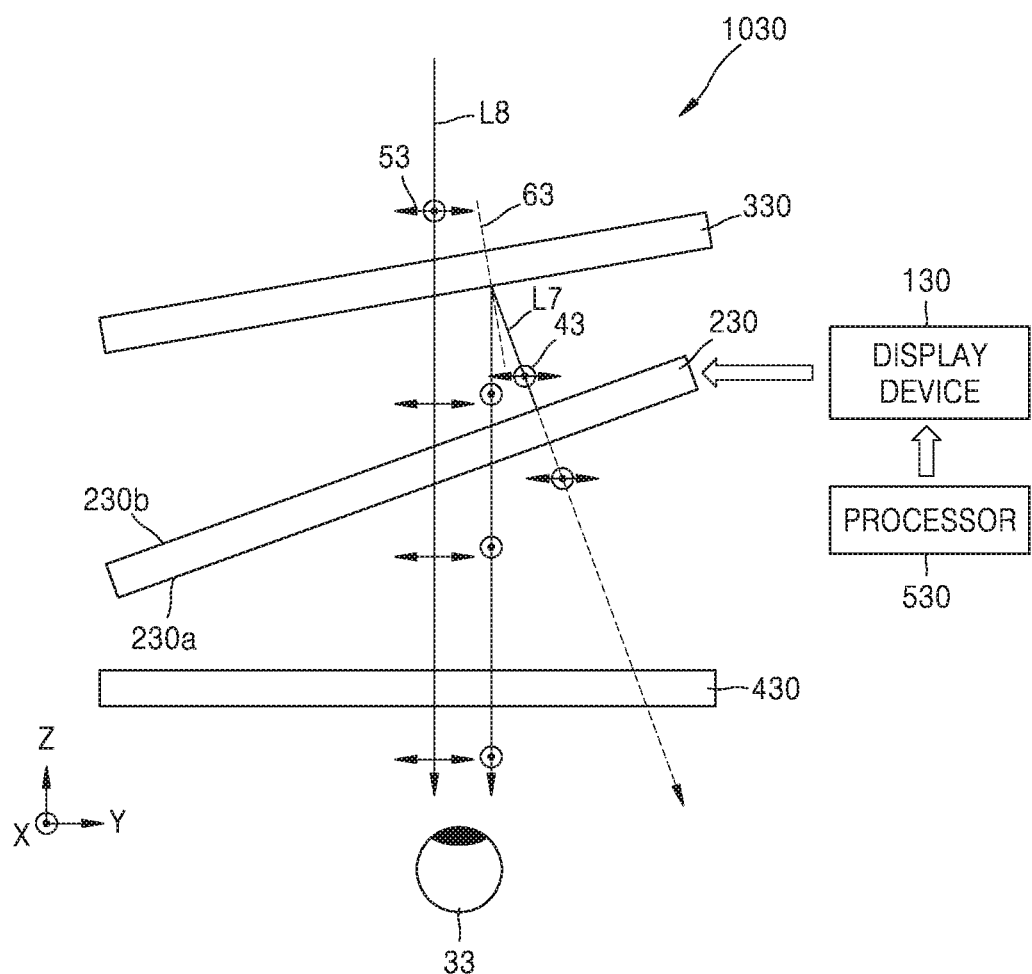
FIG. 8 is a diagram schematically illustrating a configuration of an augmented reality device according to an embodiment.

FIG. 8 is a diagram schematically illustrating a configuration of an augmented reality device 1030 according to an embodiment. In describing FIG. 8, a description of parts of FIG. 8 that are the same as those of FIG. 2 is omitted. For example, a display element 130, an optical coupler 230, a reflective polarizer 330, a polarization selective variable focus lens 430 and a processor 530 may be substantially the same as the display element 100, the optical coupler 200, the reflective polarizer 300, the polarization selective variable focus lens 400 and the processor 500 of FIG. 2.

Referring to FIG. 8, the augmented reality device 1030 may include the display element 130 which generates a first image and the optical coupler 230 which includes a first surface 230a through which the first image that is input from the display element 130 and a second surface 230b opposite the first surface 230a. The optical coupler 230 may be configured to output light that is input through the first surface 230a to the second surface 230b, and output light that is input through the second surface 230b to the first surface 230a. The augmented reality device 1030 may include the reflective polarizer 330 provided on the side of the second surface 230b of the optical coupler 230. The reflective polarizer 330 reflects light with a first polarization 43 and transmits light with a second polarization 53 which is different from the first polarization 43. The augmented reality device 1030 may include the polarization selective variable focus lens 430 provided in a traveling path of the light with the first polarization 43 that has been reflected by the reflective polarizer 330 and having variable refractive power with respect to the light with the first polarization 43.

The augmented reality device 1030 of FIG. 8 may be substantially the same as the augmented reality device 1020 of FIG. 7, except that the optical coupler 230 and the reflective polarizer 330 are formed to be inclined with respect to the polarization selective variable focus lens 430.

For example, the polarization selective variable focus lens 430 may be provided on the side of the first surface 230a of the optical coupler 230. Furthermore, a plane of the optical coupler 230 and a plane of the reflective polarizer 330 may be formed to be inclined (i.e., at a nonzero angle) with respect to a plane of the polarization selective variable focus lens 430. Angles of inclination of the optical coupler 230 and the reflective polarizer 330 with respect to the polarization selective variable focus lens 430 may be different from each other. Accordingly, first light L7 emitted from the second surface 230*b* of the optical coupler 230 may be incident on the reflective polarizer 330 at a certain angle with respect to a normal 63 of the reflective polarizer 330. In addition, the optical coupler 230 may also transmit the first light L7, that has been reflected by the reflective polarizer 330, to the first surface 230*a*. The reflective polarizer 330 may reflect light with the first polarization 43 of the first light L7 emitted from the second surface 230*b* of the optical coupler 230. The reflected light with the first polarization 43 may sequentially pass through the optical coupler 230 and the variable focus lens 430. The polarization selective variable focus lens 430 may perform focus adjustment on the light with the first polarization 43.

Second light L8 from the outside of the augmented reality device 1030 may be incident on the reflective polarizer 330. The reflective polarizer 330 may transmit light with the second polarization 53 of the second light L8. The second light L8 transmitted through the reflective polarizer 330 may sequentially pass through the optical coupler 230 and the polarization selective variable focus lens 430. The polarization selective variable focus lens 430 may not perform focus adjustment on the second light L8 with the second polarization 53.

As described above, the first light L7 with the first polarization 43 and the second light L8 with the second polarization 53 that are sequentially transmitted through the optical coupler 230 and the polarization selective variable focus lens 430 may travel toward a user's eye 33.

Figure 9:
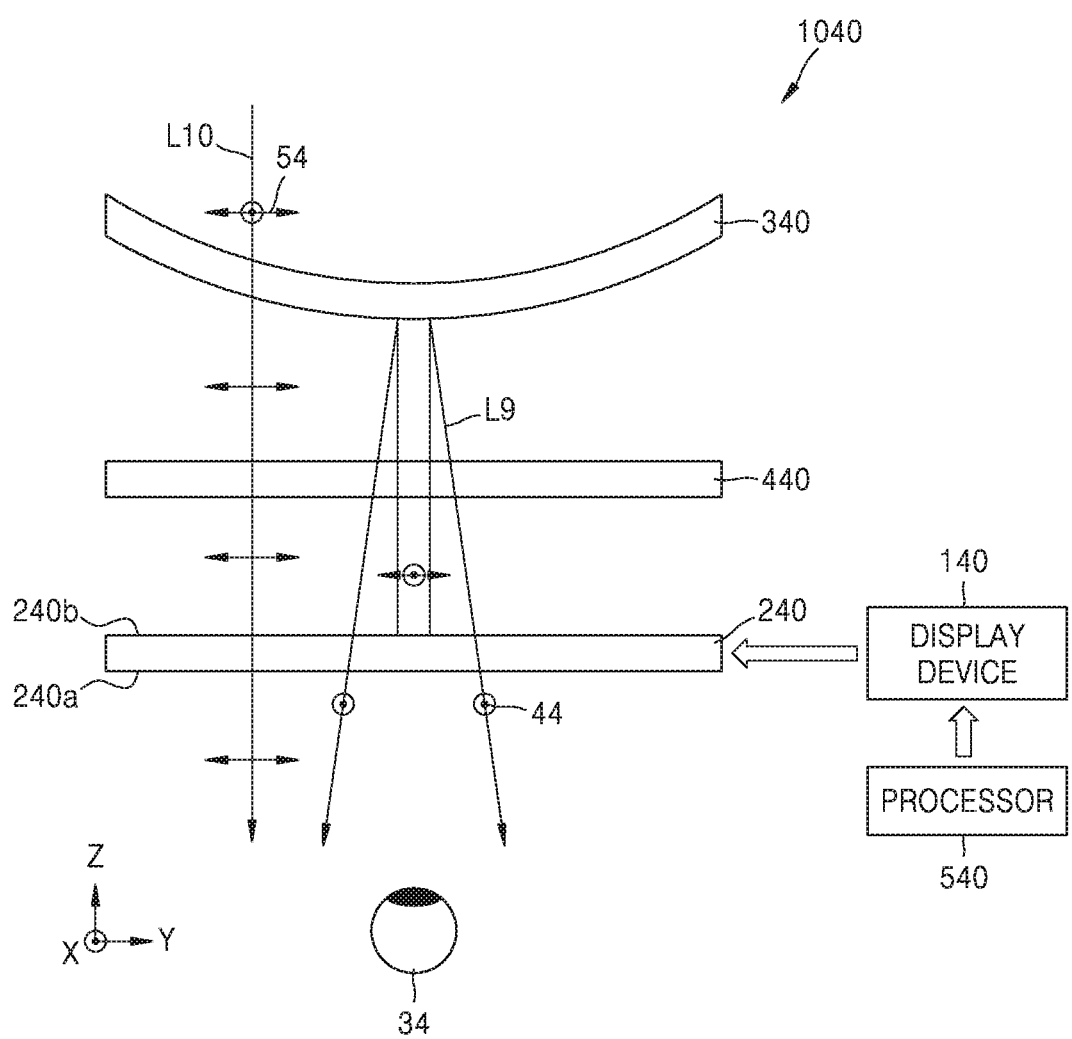
FIG. 9 is a diagram schematically illustrating a configuration of an augmented reality device according to an embodiment.

FIG. 9 is a diagram schematically illustrating a configuration of an augmented reality device 1040 according to an embodiment. In describing FIG. 9, a description of parts of FIG. 9 that are the same as those of FIG. 2 is omitted. For example, a display element 140, an optical coupler 240, a reflective polarizer 340, a polarization selective variable focus lens 440 and a processor 540 may be substantially the same as the display element 100, the optical coupler 200, the reflective polarizer 300, the polarization selective variable focus lens 400 and the processor 500 of FIG. 2.

Referring to FIG. 9, the augmented reality device 1040 may include the display element 140 which generates a first image and the optical coupler 240 which includes a first surface 240*a* through which the first image that is input from the display element 140 and a second surface 240*b* opposite the first surface 240*a*. The optical coupler 240 may be configured to output light that is input through the first side 240*a* to the second surface 240*b*, and output light that is input through the second surface 240*b* to the first surface 240*a*. The augmented reality device 1040 may include the reflective polarizer 340 provided on the side of the second surface 240*b* of the optical coupler 240. The reflective polarizer 340 reflects light with a first polarization 44 and transmits light with a second polarization 54 which is different from the first polarization 44. The augmented reality device 1040 may include the polarization selective variable focus lens 440 provided in a traveling path of the light with the first polarization 44 that has been reflected by the reflective polarizer 340 and having variable refractive power with respect to the light with the first polarization 44.

The reflective polarizer 340 may reflect incident light from the optical coupler 240, that is, light with the first polarization 44 of the first light L9. The reflective polarizer 340 may include a curved surface. For example, the reflective polarizer 340 may have a convex surface with respect to the first light L9 incident from the optical coupler 240. Accordingly, the reflective polarizer 340 may reflect the first light L9 in a direction not parallel to a direction of incidence of the first light L9, so that the first light L9 may travel toward a user's eye 34. In other words, the reflective polarizer 340 having the curved surface may perform focus adjustment on the first light L9. In this case, the first light L9 that has been reflected by the reflective polarizer 340 may travel while being diffused toward the user's eye 34. In addition, the reflective polarizer 340 may have a concave surface with respect to second light L10 incident from the outside of the augmented reality device 1040.

The polarization selective variable focus lens 440 may be provided between the optical coupler 240 and the reflective polarizer 340. In this case, the polarization selective variable focus lens 440 may perform primary focus adjustment on the first light L9 incident from the optical coupler 240. As described above, the reflective polarizer 340 may perform focus adjustment on light with the first polarization 44 of the first light L9 on which primary focus adjustment has been performed by the polarization selective variable focus lens 440 while reflecting the light with the first polarization 44. The focus adjustment performed by the reflective polarizer 340 may be referred to as secondary focus adjustment. The light with the first polarization 44 reflected by the reflective polarizer 340 may then be incident on the polarization selective variable focus lens 440. The polarization selective variable focus lens 440 may perform third focus adjustment on the light with the first polarization 44 that has been reflected by the reflective polarizer 340. The light with the first polarization 44 on which third focus adjustment is performed by the polarization selective variable focus lens 440 may then pass through the optical coupler 240. As such, the augmented reality device 1040 may perform focus adjustment three times on the light of the first polarization 44. Accordingly, refractive power of the augmented reality device 1040 with respect to the light with the first polarization 40 may be in a range of 2 diopters to 6 diopters.

Second light L10 from the outside of the augmented reality device 1040 may be incident on the reflective polarizer 340. The reflective polarizer 340 may transmit light with the second polarization 54 of the second light L10. The second light L10 transmitted through the reflective polarizer 340 may sequentially pass through the polarization selective variable focus lens 440 and the optical coupler 240. The polarization selective variable focus lens 440 may not perform focus adjustment on the second light L10 with the second polarization 54.

As such, the light with the first polarization 44 and the light with the second polarization 54 which are transmitted through the optical coupler 240 may travel toward the user's eye 34.

Figure 10:
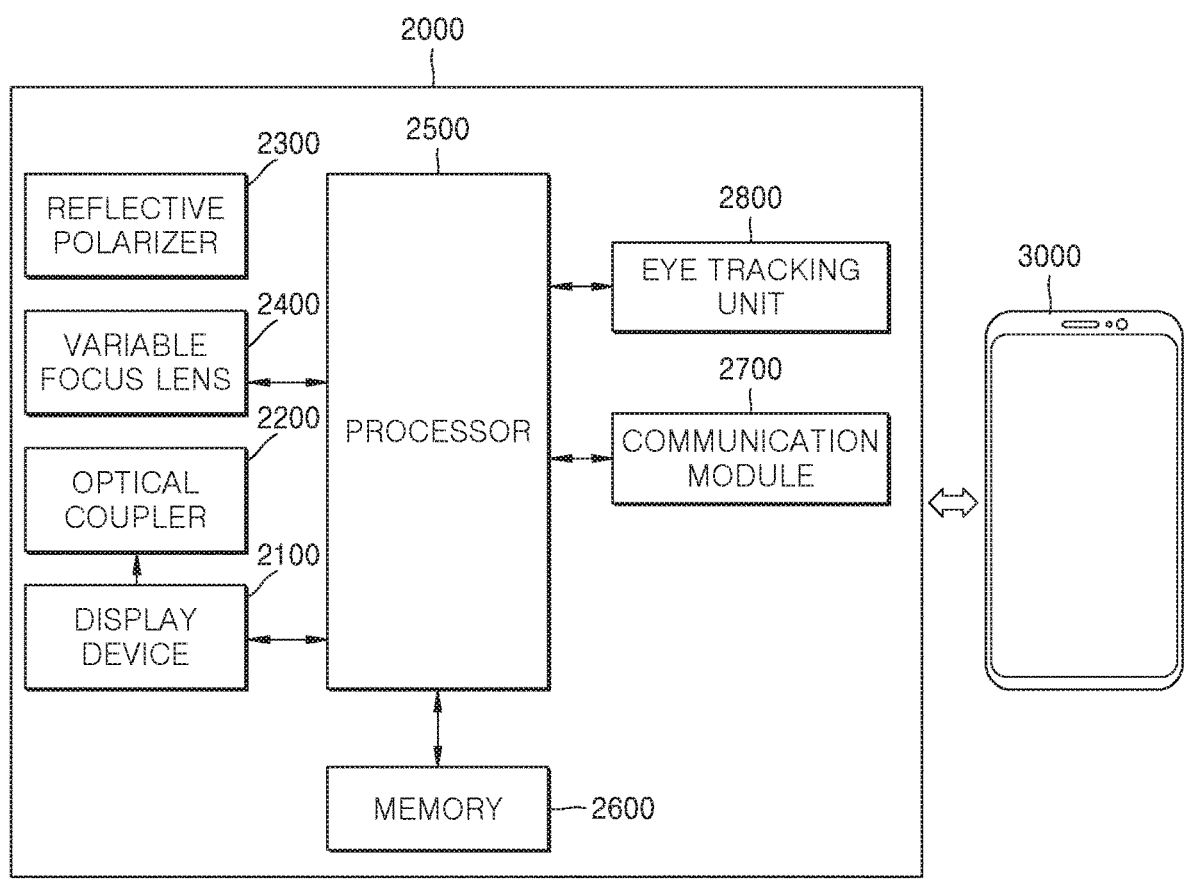
FIG. 10 is a schematic block diagram of an augmented reality device according to an embodiment.

FIG. 10 is a schematic block diagram of an augmented reality device 2000 according to an embodiment.

Referring to FIG. 10, the augmented reality device 2000 includes a display element 2100, an optical coupler 2200, a reflective polarizer 2300, a variable focus lens 2400, a processor 2500, a memory 2600, a communication module 2700 and an eye tracking unit 2800. The augmented reality device 2000 may communicate with a mobile device 3000 through the communication module 2700. The augmented reality device 2000 may be a wearable device (e.g., smart glasses).

The display element 2100, the optical coupler 2200, the reflective polarizer 2300, the variable focus lens 2400 and the processor 2500 may be respectively substantially the same as any one or more of the display elements 100, 110, 120, 130 and 140, the optical couplers 200, 210, 220, 230 and 240, the reflective polarizers 300, 310, 320, 330 and 340, the polarization selective variable focus lenses 400, 410, 420, 430 and 440, and the processors 500, 510, 520, 530 and 540 which are described above with reference to FIGS. 1 to 9.

The processor 2500 may control overall functions and/or operations performed by the augmented reality device 2000 by executing one or more instructions of a program stored in the memory 2600. The processor 2500 may include hardware components that perform arithmetic, logic and input/output operations, and signal processing. The processor 2500 may form a signal necessary for forming the first image 20 (see FIG. 1) and adjust a voltage to be applied to the variable focus lens 2400 as described above with reference to FIG. 2.

The processor 2500 may include, but is not limited thereto, for example, at least one hardware component of a central processing unit, a microprocessor, a graphics processing unit, an Application Specific Integrated Circuit (ASIC), a Digital Signal Processor (DSP), a Digital Signal Processing Device (PLD), a Programmable Logic Device (PLD), or a Field Programmable Gate Array (FPGA).

The memory 2600 may store a program including one or more instructions. The memory 2600 may include, for example, at least one type of hardware device of a flash memory type hardware device, a random access memory (RAM), a static random access memory (SRAM), a read-only memory (ROM), an electrically erasable programmable readable memory (EEPROM), a programmable read-only memory (PROM), a magnetic memory, a magnetic disk, or an optical disk.

The communication module 2700 may establish data communication between the augmented reality device 2000 and the mobile device 3000. The augmented reality device 2000 may be wirelessly connected to the mobile device 3000 through the communication module 2700.

The communication module 2700 may establish data communication between the augmented reality device 2000 and the mobile device 3000 by using at least one of data communication methods, including wireless local area network (Wireless LAN), Wi-Fi, Bluetooth, Zigbee, Wi-Fi Direct (WFD), Infrared Data Association (IrDA), Bluetooth Low Energy (BLE), Near Field Communication (NFC), Wireless Broadband Internet (Wibro), World Interoperability for Microwave Access (WiMAX), Shared Wireless Access Protocol (SWAP), Wireless Gigabit Alliance (Wi-Gig) and RF communication.

The eye tracking unit 2800 may obtain a line-of-sight vector indicating a direction of a user's line of sight by tracking a position and direction of the user's eye. For example, the eye tracking unit 2800 may obtain the user's line-of-sight vector by using a technique for detecting a direction of a line of sight through corneal reflection of infrared rays. However, the disclosure is not limited thereto, and the eye tracking unit 2800 may obtain an image of a pupil by using computer vision technology and track a change in a position of the pupil by using the obtained image. The eye tracking unit 2800 may obtain a line-of-sight vector by using a change in the position of the pupil. The eye tracking unit 2800 may provide the obtained line-of-sight vector to the processor 2500.

The augmented reality device 2000 may further include a camera (not shown) for obtaining a video and a still image by photographing a physical environment or space viewed by a user. The camera may transmit obtained video data and still image data to the processor 2500.

The augmented reality device 2000 may further include a depth camera (not shown) for measuring a depth value of a real object viewed by the user. The depth camera may photograph the physical space or environment and obtain a depth image including a depth value of a real object located in the physical space or environment. The depth image includes a 2D pixel region of a captured scene. Each pixel in the 2D pixel region may represent, for example, a depth value, such as a distance to a real object in the scene captured by the depth camera, which may be expressed in centimeters (cm), millimeters (mm), or the like. The depth camera may measure a 3D depth value by using any one of stereo-type, time-of-flight (ToF), and structured pattern. For example, the depth camera may include an RGB camera, an infrared light component, and a 3D camera, which may be used to photograph a depth image of a real object. The depth camera may transmit a depth image including a depth value of a real object to the processor 2500. The processor 2500 may obtain the depth value of the real object from the depth image received from the depth camera, and adjust a refractive index of the variable focus lens 2400 such that a virtual image is virtually displayed at a depth near the depth of the real object, based on the obtained depth value. The processor 2500 may adjust a focal length of the virtually displayed virtual image by adjusting a refractive index of the variable focus lens 2400, based on the depth value of the real object viewed by the user.

The mobile device 3000 may be operated by a user wearing the augmented reality device 2000. The mobile device 3000 may obtain an image of a real object by photographing a physical space or environment around the user through a camera. The mobile device 3000 may obtain information of the user's location by using a position sensor such as a GPS sensor. The mobile device 3000 may generate a virtual image by using information about the real object. In an embodiment of the disclosure, the mobile device 3000 may include a depth camera and obtain depth value information of the real object by using the depth camera.

The processor 2500 may control the communication module 2700 and receive at least one of information of a user's position, information of a real object, or information of a depth value of the real object from the mobile device 3000 through the communication module 2700. The processor 2500 may control the display element 2100 to project a virtual image based on the received information of the user's position and information of the real object information to the optical coupler 2200.

In an embodiment, the augmented reality device 2000 may receive a virtual image generated by the mobile device 3000 from the mobile device 3000 through the communication module 2700. The processor 2500 may control the display element 2100 to project the received virtual image toward the optical coupler 2200.

In an embodiment, the augmented reality device 2000 may receive the information of the depth value of the real object from the mobile device 3000 through the communication module 2700. The processor 2500 may adjust the refractive index of the variable focus lens 2400 such that the virtual image based on the depth value received from the mobile device 3000 is virtually displayed at a depth near the depth of the real object. Accordingly, the processor 2500 may adjust a focal length of the virtually displayed virtual image by adjusting the refractive index of the variable focus lens 2400, based on the depth value of the real object viewed by the user.

The augmented reality device 2000 described herein may be implemented with hardware components, software components, and/or a combination of hardware components and software components. For example, the augmented reality device 2000 may be implemented using one or more general-purpose computers or special-purpose computers, such as arithmetic logic units (ALUs), Application Specific Integrated Circuits (ASICs), Digital Signal Processors (DSPs), Digital Signal Processing Devices (DSPDs), Programmable Logic Devices (PLDs), micro-computes, micro-processors, or any other devices capable of executing or responding to instructions.

The software components may include a computer program, code, instructions, or a combination of one or more of them, and cause a processing device to operate as desired or send instructions independently or collectively to the processing device.

The software components may be embodied as a computer program including instructions stored in a computer-readable recording medium. The computer-readable recording medium may include, for example, a magnetic storage medium (e.g., ROM, random-access memory (RAM), a floppy disk, a hard disk, etc.) and an optical reading medium (e.g., a CD-ROM), a Digital Versatile Disc (DVD), and the like. The computer-readable recording medium may be distributed over network coupled computer systems so that computer readable code may be stored and executed in a distributed fashion.

An augmented reality device and a wearable device including the same according to an embodiment includes a wire grid polarizer to reflect light of a first polarization and transmit light of a second polarization, thereby more easily separating polarization of a real object with that of a beam of a virtual image.

Using an augmented reality device and a wearable device including the same according to an embodiment, focus adjustment can be performed on a virtual image to reduce dizziness that a user feels.

The above-described augmented reality device and the wearable device including the same have been described above with reference to embodiments illustrated in the drawings to help understanding thereof but are only examples, and it will be understood by those of ordinary skill in the art that various modifications may be made and equivalent embodiments may be implemented. Therefore, the technical scope of the augmented reality device and the wearable device including the same should be determined by the appended claims.

What is claimed is:

1. An augmented reality device comprising:
 a display element configured to generate a first image;
 an optical coupler comprising a first surface through which the first image is input and a second surface opposite the first surface, the optical coupler being configured to output light that is input through the first surface to the second surface and output light that is input through the second surface to the first surface;
 a reflective polarizer provided on the side of the second surface of the optical coupler and configured to reflect first polarized light with a first polarization and transmit second polarized light with a second polarization different from the first polarization; and
 a polarization selective variable focus lens provided in a traveling path of the first polarized light that has been reflected by the reflective polarizer, the polarization selective variable focus lens having variable refractive power with respect to the first polarized light,
 wherein a plane of the optical coupler and a plane of the reflective polarizer are inclined at a nonzero angle with respect to a plane of the polarization selective variable focus lens.

2. The augmented reality device of claim 1, wherein the optical coupler is further configured to combine the first polarized light that has been reflected by the reflective polarizer and the second polarized light that has been transmitted by the reflective polarizer and provide a combination result to a user.

3. The augmented reality device of claim 1, wherein a first polarization axis of the first polarization and a second polarization axis of the second polarization are perpendicular to each other.

4. The augmented reality device of claim 1, wherein the reflective polarizer comprises a wire grid polarizer,
 wherein the wire grid polarizer comprises a substrate and a plurality of parallel conductive wires on the substrate.

5. The augmented reality device of claim 4, wherein the plurality of parallel conductive wires comprise metal wires.

6. The augmented reality device of claim 1, wherein the first polarized light is perpendicularly incident to the polarization selective variable focus lens.

7. The augmented reality device of claim 1, wherein the optical coupler comprises an input grating provided on the first surface or the second surface,
 wherein the input grating is configured to diffract the light that is input through the first surface such that the light that is input through the first surface travels inside the optical coupler while being totally reflected.

8. The augmented reality device of claim 7, wherein the optical coupler further comprises an output grating provided on the first surface or the second surface,
 wherein the output grating is configured to output light, which has traveled inside the optical coupler while being totally reflected, to the outside of the optical coupler toward the reflective polarizer.

9. The augmented reality device of claim 1, wherein the polarization selective variable focus lens comprises a liquid crystal lens of electrically variable refractive power.

10. The augmented reality device of claim 1, wherein the polarization selective variable focus lens has no refractive power with respect to the second polarized light.

11. The augmented reality device of claim 1, wherein a refractive power of the augmented reality device with respect to the first polarized light is in a range of 0 diopters to 4 diopters.

12. The augmented reality device of claim 1, wherein the polarization selective variable focus lens is provided between the reflective polarizer and the optical coupler.

13. The augmented reality device of claim 1, further comprising a processor configured to transmit, to the display element, a signal based on data processed to generate the first image.

14. The augmented reality device of claim 1, further comprising a processor configured to adjust a voltage to be applied to the polarization selective variable focus lens.

15. The augmented reality device of claim 1, wherein the polarization selective variable focus lens is provided on the side of the first surface of the optical coupler.

16. The augmented reality device of claim 15, wherein a plane of the reflective polarizer and a plane of the optical coupler are inclined at a nonzero angle with respect to a plane of the polarization selective variable focus lens, and wherein the optical coupler is further configured to output a part of the light that is input through the first surface to the first surface toward the polarization selective variable focus lens.

17. The augmented reality device of claim 1, wherein the reflective polarizer comprises a curved surface.

18. The augmented reality device of claim 17, wherein a refractive power of the augmented reality device with respect to the first polarized light is in a range of 2 diopters to 6 diopters.

19. The augmented reality device of claim 1, wherein the augmented reality device comprises a wearable device.

\* \* \* \* \*